United States Patent
Yang et al.

(10) Patent No.: US 9,021,463 B2
(45) Date of Patent: *Apr. 28, 2015

(54) METHOD, SYSTEM AND APPARATUS FOR MANAGEMENT OF PUSH CONTENT

(71) Applicant: BlackBerry Limited, Waterloo (CA)

(72) Inventors: Han Zhen Yang, Mississauga (CA); Rakesh Kumar Arora, Burlington (CA); Onofre Manuel De Melo, Brampton (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,582

(22) Filed: Sep. 17, 2013

(65) Prior Publication Data
US 2014/0019637 A1 Jan. 16, 2014

Related U.S. Application Data

(63) Continuation of application No. 12/579,796, filed on Oct. 15, 2009, now Pat. No. 8,561,055.

(51) Int. Cl.
G06F 9/44 (2006.01)
H04K 1/00 (2006.01)
H04L 29/08 (2006.01)
G06F 9/445 (2006.01)

(52) U.S. Cl.
CPC ........ *H04L 67/26* (2013.01); *G06F 8/61* (2013.01); *G06F 8/62* (2013.01)

(58) Field of Classification Search
CPC .... G06F 21/10; G06Q 30/0633; H04L 67/06; H04L 67/10
See application file for complete search history.

(56) References Cited

U.S. PATENT DOCUMENTS

2004/0045000 A1* 3/2004 Hara .............................. 717/178
2009/0252325 A1* 10/2009 Reus et al. .................... 380/255

OTHER PUBLICATIONS

U.S. Appl. No. 12/579,796, filed Oct. 15, 2009; Title: Method, System and Apparatus for Management of Push Content; now Issued Patent No. 8561055.

* cited by examiner

*Primary Examiner* — Hyun Nam
(74) *Attorney, Agent, or Firm* — Perry + Currier Inc.

(57) ABSTRACT

A method, system and apparatus for management of push content is provided. An intermediation infrastructure mediates traffic from a push content server that is addressed to a computing device. The intermediation infrastructure enforces various policies such that, for example, unwanted communications are not pushed to the computing device.

17 Claims, 7 Drawing Sheets

METHOD, SYSTEM AND APPARATUS FOR MANAGEMENT OF PUSH CONTENT

FIELD

The present specification relates generally to telecommunications and more particularly relates to a method, system and apparatus for management of push content.

BACKGROUND

Computing devices that access telecommunication networks frequently connect to those networks via one or more network intermediaries, such as a mobile telecommunication carrier, an enterprise, or a manufacturer of the computing device. Having connected to the network, either directly or through one or more intermediaries, such computing devices may subscribe to one or more host services that push content to the computing device.

DETAILED DESCRIPTION OF THE EMBODIMENTS

An aspect of this specification provides an intermediation server comprising at least one network interface for connecting, via at least one network, to at least one computing device and at least one push content server; the push content server configured to maintain push content; the at least one computing device configured to selectively install or uninstall a push content application uniquely corresponding to the push content; a processor connected to the at least one network interface via a bus; the processor configured to receive the push content; the push content addressed to the computing device; a storage device connected to the processor via the bus; the storage device configured to maintain a policy; the policy indicating whether or not the push content application is installed on the computing device; and, the processor configured to access the policy from the storage device when the push content is received; the processor configured, based on the policy, to forward the push content to the computing device if the push content application is installed on the computing device.

The processor can be further configured to send an exception message back to the push content server if the push content application is not installed on the computing device.

The message can include an instruction to the push content server to update a policy maintained at the push content server to cease sending further push content to the computing device.

The network interface can be further connected to a firewall and the processor can be configured to selectively instruct the firewall to block further reception of any push content from the push content server.

The processor can be further configured to decrement an allotment of permitted traffic of push content by the push content server. The processor can be further configured to block forwarding of the push content to the computing device if the allotment has reached zero. The processor can be further configured to decrement the allotment regardless of whether or not the push content application is installed on the computing device.

The policy can further indicate certain additional conditions for controlling forwarding the push content to the computing device regardless of whether the push content application is installed on the computing device. The conditions can include a determination as to whether or not the computing device is roaming and the processor is configured to forward the push content only if the computing device is additionally not roaming. Or, the conditions can include a determination as to certain time periods when forwarding of the push content is permitted, and the processor is further configured to forward the push content only if the time periods indicate forwarding is permitted.

Another aspect of this specification provides a computer-implemented method of managing content pushed from a content server and addressed to a computing device; the content uniquely corresponding to a push content application; the method comprising: receiving at at least one processor, via at least one network interface, push content from the content server and addressed to the computing device; receiving at the processor, from a storage device, a policy indicating whether the push content application is installed on the computing device; forwarding from the processor, via the at least one network interface, the push content to the computing device if the policy indicates the push content application is installed on the computing device.

The method can further comprise sending an exception message back to the push content server if the push content application is not installed on the computing device.

The message can include an instruction to the push content server to update a policy maintained at the push content server to cease sending further push content to the computing device.

The network interface can be further connected to a firewall and the processor is configured to selectively instruct the firewall to block further reception of any push content from the push content server.

The method can further comprise decrementing an allotment of permitted traffic of push content by the push content server. The method can further comprise blocking forwarding of the push content to the computing device if the allotment has reached zero.

The method can further comprise decrementing the allotment regardless of whether or not the push content application is installed on the computing device.

A method, system and apparatus for management of push content are provided. An intermediation infrastructure mediates traffic from a push content server that is addressed to a computing device. The intermediation infrastructure enforces various policies such that, for example, unwanted communications are not pushed to the computing device.

A method, system and apparatus for management of push content are provided. An intermediation infrastructure mediates traffic from a push content server that is addressed to a computing device. The intermediation infrastructure enforces various policies such that, for example, unwanted communications are not pushed to the computing device.

Figure 1:
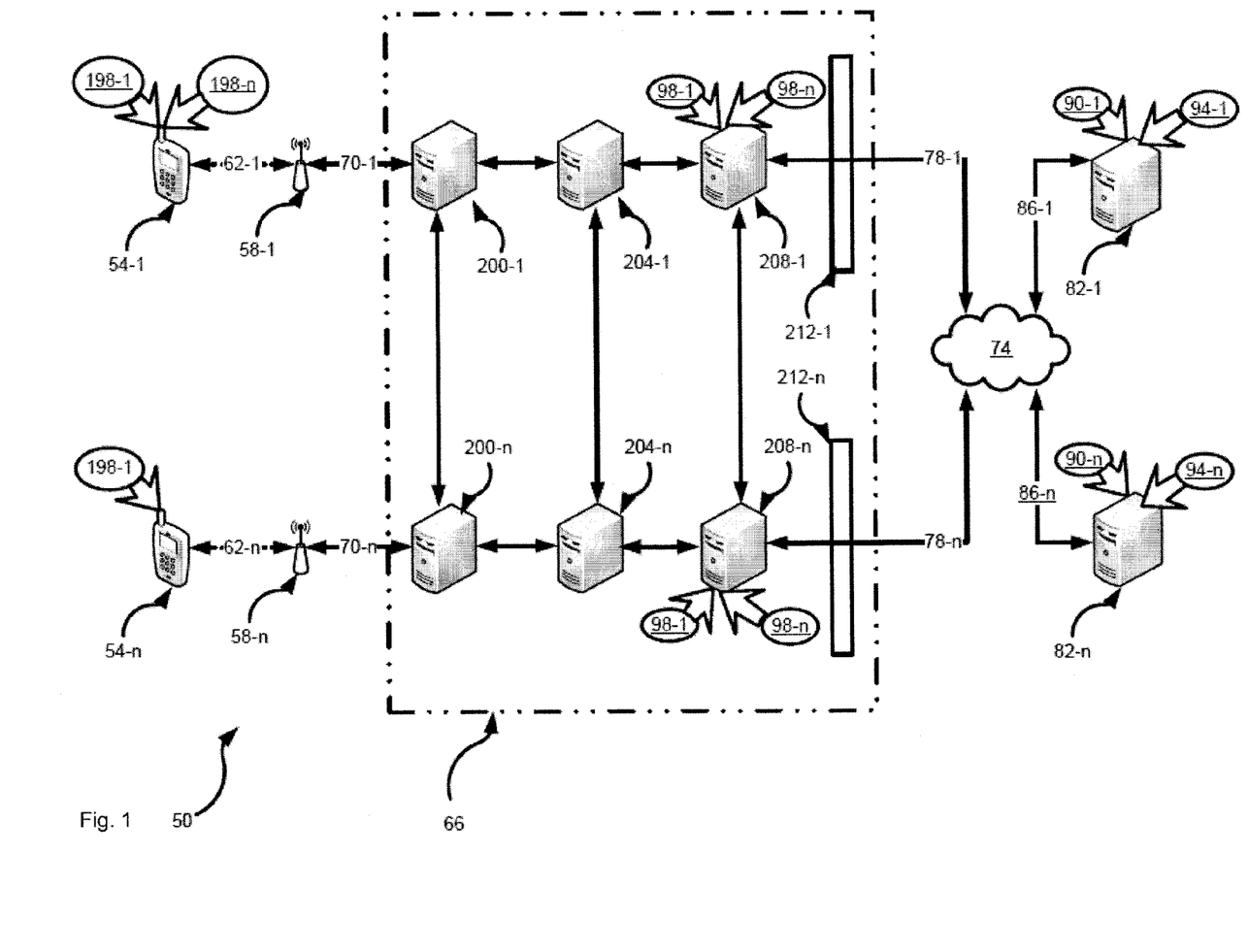
FIG. 1 is a schematic representation of a system for management of push content.

Referring now to FIG. 1, a system for management of push applications is indicated generally at 50. System 50 comprises a plurality of computing devices 54-1 ... 54-n. (Hereafter, generically these are referred to as computing device 54, and collectively, computing devices 54. This nomenclature is used elsewhere herein.) Each computing device 54 is configured to connect to one or more wireless access points 58 via a wireless link 62.

Figure 2:
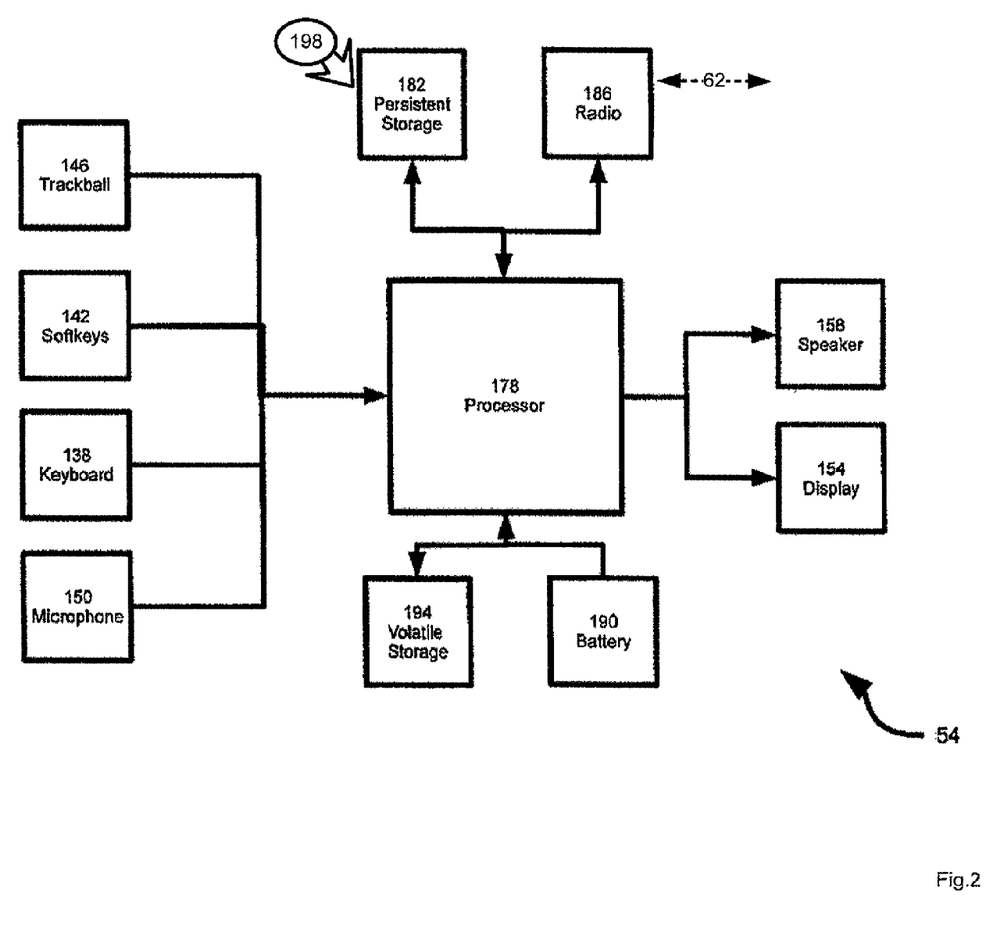
FIG. 2 is a schematic representation of a computing device of FIG. 1.

The structure and features of each client device 54 can vary. However, to provide an example, FIG. 2 shows a block diagram representing exemplary components of client device 54. Client device 54 thus includes a processor 178 which interconnects input devices of client device 54 (e.g. a trackball 146, soft keys 142, keyboard 138, and a microphone 150) and output devices of client device 54 (e.g. a speaker 158, a display 154 and a camera flash 166). Other types of input devices and output devices are contemplated. Processor 178 is also connected to a persistent storage device 182. As discussed earlier, persistent storage device 182 can be implemented using flash memory or the like, or can include other programmable read only memory ("PROM") technology or can include read only memory ("ROM") technology or can include a removable "smart card" or can comprise combinations of the foregoing.

Device 54 also includes a wireless radio 186 that connects wirelessly to access point 62 to provide wireless email, telephony and web-browsing functionality. Client device 54 also includes a battery 190 which is typically rechargeable and provides power to the components of client device 54. In FIG. 2, for simplicity battery 90 is only shown connected to processor 78, but it will be understood that battery 190 is connected to any component (e.g. radio 188 and display 154) within client device 54 that needs power to operate. Client device 54 also includes volatile storage 194, which can be implemented as random access memory ("RAM"), which can be used to temporarily store applications and data as they are being used by processor 178. Collectively, one can view processor 178, volatile storage 194 and persistent storage device 182 and as a microcomputer. It is now apparent that device 54 is based on the structure and functionality of a portable wireless device such as a Blackberry™ device from Research in Motion Inc., of Waterloo Canada, but it is to be stressed that this is a purely exemplary client device, as client device 54 could also be based on any type of client computing device including portable wireless devices from other manufacturers, desktop computers, laptop computers, cellular telephones and the like.

The microcomputer implemented on client 54 is thus configured to store and execute the requisite BIOS, operating system and applications to provide the desired functionality of client 54. In a present embodiment, each client maintains at least one push application 198, the details of which will be discussed further below.

Those skilled in the art will now recognize that persistent storage device 182 and volatile storage 194 are each non-limiting examples of computer readable media capable of storing programming instructions that are executable on processor 178.

Referring again to FIG. 1, computing device 54-1 is shown connected to access point 58-1, while computing device 54-n is shown connected to access point 58-n, but it is to be understood that either computing device 54 can connect to either access point 58. Furthermore it is to be understood that various configurations are contemplated as to how the infrastructure of each access point 58 is implemented. As a non-limiting example, it is contemplated that where a carrier operates access point 58-1, then that carrier may also issue the subscription to computing device 54-1 that permits computing device 54-1 to connect to access point 58-1. Likewise, it is also contemplated that a carrier that operates access point 58-2 may also issue the subscription to computing device 54-n that permits computing device 54-2 to connect to access point 58-n. The carrier that operates access point 58-1 may be the same or different from the carrier that operates access point 58-n. Where different carriers are involved, it will be understood that system 50 contemplates roaming configurations whereby a particular computing device 54 is considered to be roaming if it connects to an access point 58 that is operated by a different carrier. It will also now be understood that more than two computing devices 54, access points 58, and carriers are contemplated in various implementations.

Each link 62 can be based on any wireless protocol, including but not limited to Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11, Bluetooth™ or any of their variants or successors. It is also contemplated each computing device 54 can include multiple radios 186 to accommodate the different protocols that may be used to implement each link 62. It is also contemplated that in other embodiments, one or both access points 58 can be wired access points so that link(s) 62 are also wired. It will now be understood that each access point 58 is configured to communicate with device 54 according to the type of respective link 62, and that in some variations one or both links 62 can be wired.

Each access point 58, in turn is connected to an intermediary infrastructure 66 via links 70. Again, the nature of each link 70 is not particularly limited, and typically corresponds to its type of access point 58. Each link 70 can, for example, be wired as backhaul via a T-carrier link (e.g. T1, T3) or E-carrier link or the like. Intermediary infrastructure 66 in turn is connected to the Internet 74 (or other type of wide area network) via links 78. Links 78 can also be backhaul like links 70. In other configurations, links 70 can themselves be implemented via Internet 74 and thereby obviate the need for a direct connection to intermediary infrastructure 66 from access points 58.

A plurality of content server 82, in turn, connect to Internet 74 via links 86. Each content server 82 is different from the other, and thus each content server 82 is configured to host different application content 90. The type and nature of application content 90 is not particularly limited. Weather, news and stock prices are three non-limiting examples of application content 90. In system 50, application content 90 from a given content server 82 can be pushed to one or more computing devices 54 via intermediary infrastructure 66. As will be explained further, system 50 is configured such that content 90 pushed from a given content server 82 is only actually received at a computing device 54 that subscribes to that content.

(Another aspect of the flexible nature of system 50 is that system 50 can be configured so that each device 54 can, as part of its subscription, further specify that all of the content 90 from a particular content server 82 is to be pushed, or only a selected portion of content 90 from a particular content server 82 is to be pushed. As an example, assume that content server 82-1 hosts weather information, then content 90-1 can include weather content for different locales. In this example, device 54-1 can be operated so as to indicate via application 198-1 that one particular locale of weather information is to be pushed within content 90-1, while device 54-2 can be operated so as to indicate via application 198-1 another particular locale of weather information that is to be pushed within content 90-1. This feature is not discussed in detail further herein for sake of simplifying explanation of the embodiments, but those skilled in the art will now recognize how it can be implemented in conjunction with the other teachings of this specification.)

In the exemplary configuration of FIG. 1, content subscription is effected by installing a push application 198 on computing device 54 that uniquely corresponds to specific content 90, and therefore computing device 54-1 is shown as having a first push application 198-1 (which uniquely corresponds to content 90-1) and a second push application 198-$n$ (which uniquely corresponds to content 90-n) installed thereon, while computing device 54-2 is shown as only having first push application 198-1. Thus, according to this exemplary configuration, both content 90-1 and content 90-$n$ can be pushed to device 54-1, but only content 90-1 can be pushed to device 54-$n$. An example of unique correspondence between an application 198 and particular content 90 can include a push application 198 for weather content 90, whereby the weather push application 198 is configured to generate graphics, text, audio and even video messages according to uniquely formatted weather content 90. By contrast, another push application 198 can uniquely correspond to news content 90, whereby specifically formatted news content 90 may only be generated using the uniquely corresponding news push application 198.

In the embodiment of FIG. 1, the policing of the subscription of push content is managed in two ways, though other ways are contemplated. First, each content server 82 maintains its own content server policy 94. Second, each intermediary infrastructure 66 maintains its own version of content server policies 94 in the form of local subscription policies 98. Thus, local subscription policy 98-1 corresponds to content server policy 94-1, while local subscription policy 98-$n$ corresponds to content server policy 94-$n$. Thus, when system 50 is operating without policy conflicts, then policy 94-1 and policy 98-1 indicate that content 90-1 can be pushed to both device 54-1 and device 54-$n$, while policy 94-$n$ and policy 98-$n$ indicate that content 90-$n$ can only be pushed to device 54-1. When policy conflicts arise it is possible that a given content server 82 may attempt to improperly push content 90 to a device 54 that has not subscribed to that content 90, in which case intermediary infrastructure 66 is configured to block that pushed content 90, such that it never arrives at that non-subscribed device 54.

There are a number of ways to implement intermediary infrastructure 66, however a specific intermediary infrastructure 66 is presently contemplated, whereby intermediary infrastructure 66 includes at least one gateway 200, at least one mediation server 204, at least one policy server 208, and at least one Internet firewall 212. In FIG. 1, a plurality of gateway 200 are employed, whereby one gateway 200 connects to a corresponding access point 58 via a corresponding link 70. Likewise, as shown in FIG. 1, a plurality of mediation servers 204 and a plurality of policy servers 208 are also employed.

Mediation servers 204 are configured to connect device 54 to a range of applications or services (not shown herein but which can include, for example, web-browsing for devices 54, mapping applications for devices 54, or location based services for devices 54) including the push data service available from content servers 82 that are contemplated herein. Where such other applications or services are not provided, then mediation server 204 can be omitted altogether.

Policy servers 208 implement policies 98 as discussed generally above and in more detail below.

In the presently contemplated configuration, gateway 200-1, mediation server 204-1, policy server 208-1 and firewall 212-1 are substantially dedicated to traffic associated with access point 58-1, while gateway 200-$n$, mediation server 204-$n$, policy server 208-$n$ and firewall 212-$n$ are substantially dedicated to traffic associated with access point 58-$n$. This presently contemplated configuration is believed to assist with load balancing. Cross connections between each gateway 200, mediation server 204, and policy server 208 permit traffic to be carried by either set in the event of failure of one set. Accordingly, gateway 200-1, mediation server 204-1, policy server 208-1 and firewall 212-1 can be configured to expect to manage traffic associated with computing device 54-1 (rather than computing device 54-$n$), so that, for example, the portion of policies 98-1 and 98-$n$ that are relevant to computing device 54-1 are primarily active in policy server 208-1, while the portion of policies 98-1 and 98-$n$ that are relevant to computing device 54-$n$ are primarily active in policy server 208-$n$; however, in the event that a computing device 54 were to roam so as to connect to another access point 58, the policing function of intermediation infrastructure 66 can continue. For example, if computing device 54-1 were to connect to access point 58-$n$, then policy server 208-$n$ can access policy server 208-1 in order to obtain the portion of policies 98-1 and 98-$n$ that are relevant to computing device 54-1. It will now be understood that this configuration can be scaled to thousands or millions of computing devices 54 and hundreds or thousands of access points 58. By the same token it will now be understood that this configuration can be particularly useful when access points 58 are located far from each other, such as in different cities, countries or continents.

Intermediation infrastructure 66 can also be configured to encrypt content 90 that is pushed to each computing device 54. For example, policy servers 208 can be configured such that all communications over Internet 74 between policy servers 208 and content servers 82 are encrypted. Unique public and private key pairs deployed between each policy server 208 and each content server 82 can be used to effect such encryption. Likewise, gateways 200 and devices 54 can be configured such that all communications therebetween via access point 58 are encrypted. Unique public and private key pairs between each computing device 54 and each gateway 200 can be used to effect such encryption. Furthermore, encryption can be included between subscribing computing devices 54 and content servers 82 so that the ultimate payload of any content 90 destined for the subscribing computing device 54 is encrypted along the entire pathway between content servers 82 and computing devices 54, even though addressing information and other header information associated with content 90 remains accessible to policy servers 208 so that appropriate policies 98 can be applied to that content 90 and routing of that content 90 can be effected.

In one non-limiting specific example, according to the BlackBerry™ infrastructure from Research in Motion Ltd. of Waterloo, Ontario, Canada, computing devices 54 can be implemented as BlackBerry™ devices; gateways 200 can be implemented as a suitable variation of the Relay component of the BlackBerry™ infrastructure; and mediation servers 204 can be implemented as a suitable variation of the Mobile Data Services (MDS) servers of the BlackBerry™ infrastructure.

While not shown in FIG. 1, system 50 can additionally include other intermediation components, such as an enterprise mediation server that resides along link 70-1, or an internet mediation server that resides along link 70-1. In a non-limiting example, such an enterprise mediation server can be implemented using a BlackBerry™ Enterprise Server (BES) according to the BlackBerry™ infrastructure while an internet intermediation server can be implemented using a BlackBerry™ Internet Server (BIS) according to the BlackBerry™ infrastructure.

In variations, such as implementations that are not based on the BlackBerry™ infrastructure, then gateway 200 and policy server 208 can be implemented as a single computing device, and mediation server 204 can be omitted altogether if desired.

Figure 3:
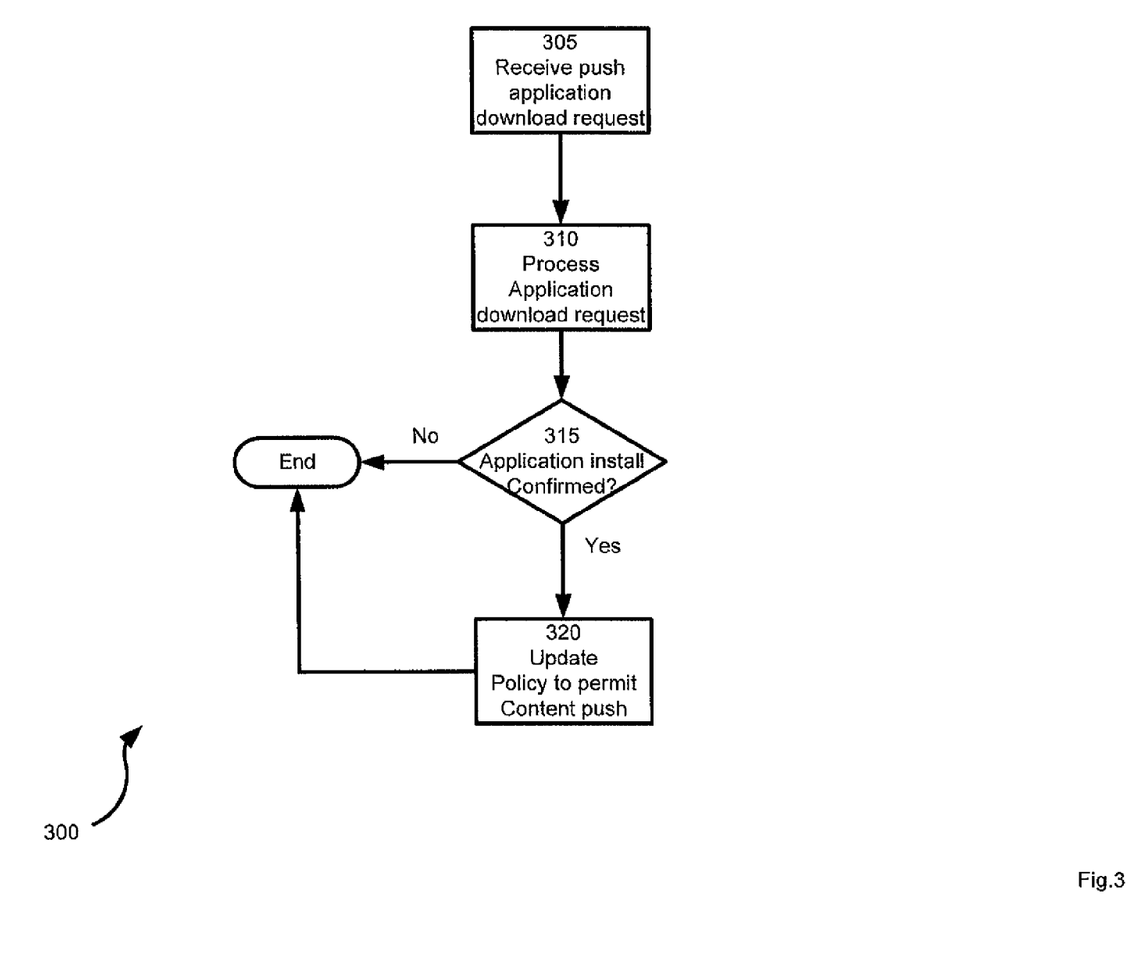
FIG. 3 shows a flowchart depicting a method for managing push content policy.

Referring now to FIG. 3, a method for managing push content policies is represented in the form of a flowchart and indicated generally at 300. Method 300 can be implemented using system 50 or variations thereof. Method 300 can also be implemented by policy server 208 or content server 82 or both. In a present embodiment method 300 is implemented by both, although with appropriate contextual modifications thereto.

Block 305 comprises receiving a request for a push application to be downloaded. Such a request originates from a device 54. The request indicates which push application 198 is being requested; in the present example of FIG. 1, the request thus specifically originates from either device 54-1 or device 54-n, and indicates a request to download either push application 198-1 or push application 198-n.

As a first illustrative example, assume that computing device 54-n sends a request to policy server 208-n to download application 198-n. When block 305 is performed by policy server 208-n, it will receive that request.

Block 310 comprises processing the application download request that is received at block 305. Continuing with the first illustrative example, when block 310 is performed by policy server 208-n, it will facilitate the downloading of push application 198-n to the requesting device 54-n. Such facilitation can take the form of forwarding the download request to any server (such as content server 82-n, or a more general application download server) that hosts a downloadable copy of push application 198-n, so that a copy of application 198-n is downloaded onto device 54-n.

Block 315 comprises confirming whether the application was actually installed on the device that originated the request received at block 305. Block 315 can be effected on policy server 208-n by policy server 208-n waiting for an acknowledgement message to be sent from the requesting device that signals confirmation that the requested application was actually installed on the requesting device. Continuing with the first illustrative example, application 198-n can be configured so that upon completion of installation device 54-n, or at run-time on device 54-n, an acknowledgement message is sent from device 54-n to the policy server 208-n confirming that application 198-n was actually installed on device 54-n. In this instance a "yes" determination is made at block 315 which leads to block 320, at which point policy 98-n maintained on policy server 208-n is updated to that push content 90-n can be pushed from content server 82-n to device 54-n. If no such acknowledgement is ever received by policy server 208-n, then a "no" determination is made at block 315 which leads method 300 to end.

Figure 4:
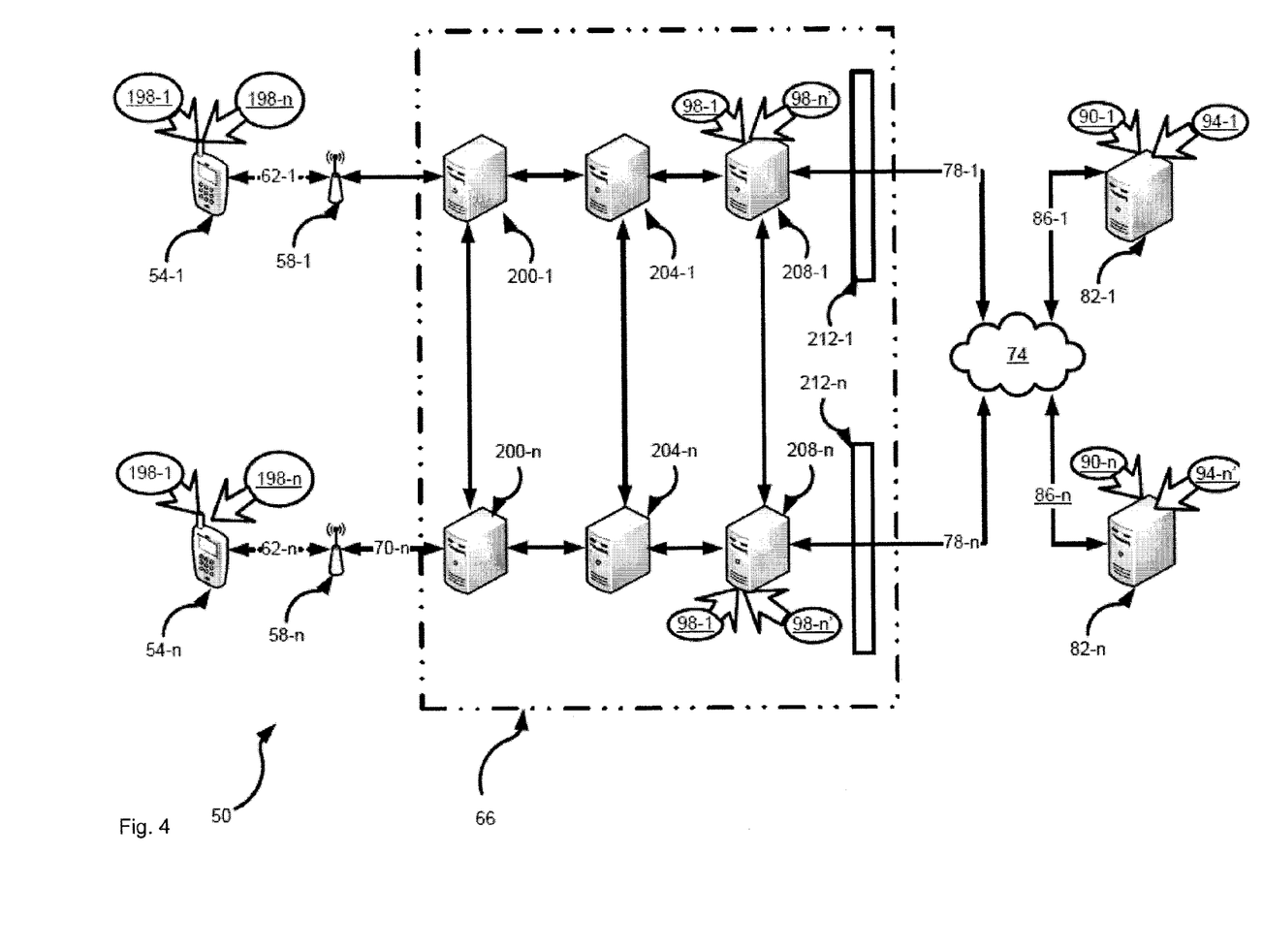
FIG. 4 shows the system of FIG. 1 after performance of an illustrative example of the performance of the method of FIG. 3.

FIG. 4 shows the results of a "yes" determination at block 315 according to the first illustrative example, whereby application 198-n is now installed on device 54-n, and policy 98-n now bears the reference 98-n', the apostrophe ("'") indicating that policy 98-n was updated at block 320, and that the updated policy 94-n' now indicates that server 82-n is authorized to push content 90-n to device 54-n.

As discussed, a suitable contextual variation of method 300 is also performed by content servers 82. In the first illustrative example, when block 320 is reached by server 82-n, then policy 94-n is updated, so that in FIG. 4, policy 94-n now bears the reference 94-n', the apostrophe ("'") indicating that policy 94-n was updated at block 320 by server 82-n, that updated policy 94-n' now indicating that server 82-n should push content 90-n to device 54-n.

The contextual variation of method 300 for content servers 82 depends in part on whether servers 82 are actually hosting the downloading of the push application 198, or not. Where the content server 82 is not hosting the actual downloading, the blocks 305 and 310 can be omitted for content server 82, such that only block 315 and block 320 remain.

In more general terms, it should also be understood that method 300 can be varied such that the decision at block 315 can be based on any validation originating from or associated with the requesting device 54 that the pushing of content 90 from a particular server 82 to that requesting device 54 is authorized.

Figure 5:
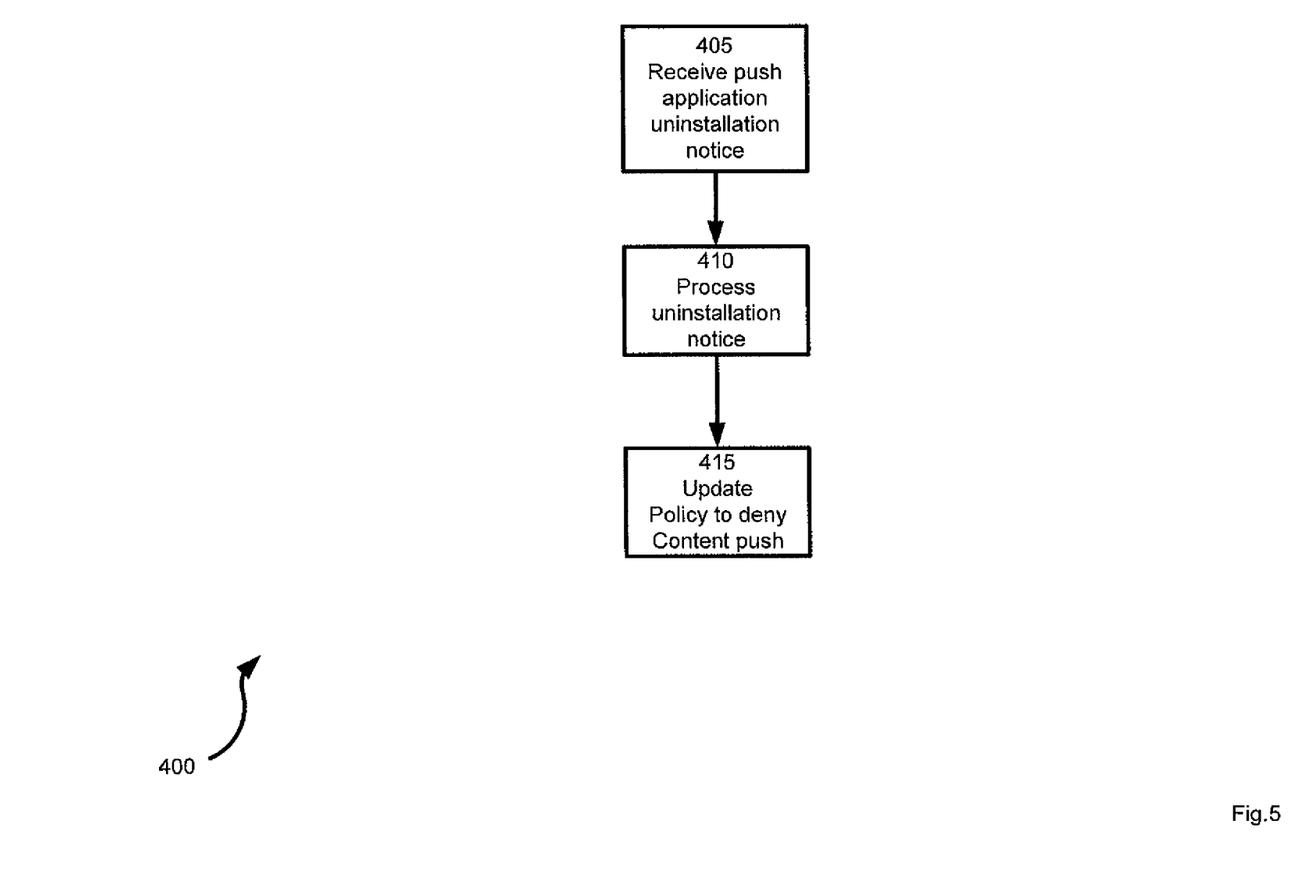
FIG. 5 shows a flowchart depicting another method for managing push content policy.

Referring now to FIG. 5, another method for managing push content policy is represented in the form of a flowchart and indicated generally at 400. Method 400 can be implemented using system 50 or variations thereof. Method 400 can also be implemented by policy server 208 or content server 82 or both. In a present embodiment method 400 is implemented by both, although with appropriate contextual modifications thereto.

While method 300 involved the updating of a policy so as to permit push content, method 400 in contrast is a method to update a policy so as to deny push content. Thus, block 405 comprises receiving a notice that a particular push application has been uninstalled from a particular device. In a second illustrative example, assume that method 300 has already been performed using the first illustrative example. Also in this second illustrative example, assume that device 54-n has uninstalled push application 198-n therefrom. Push application 198-n, or some other application in device 54-n, is thus configured to send a notification from device 54-n to policy server 208-n notifying policy server 208-n of the uninstallation. At block 410, the uninstallation notice is processed at policy server 208-n. Block 410 can include sending a notification of the uninstallation onto the content server 82-n, so that content server 82-n can likewise perform its own local version of method 400 and thereby update its local policy to cease further pushing of content 90-n to device 54-n. Block 415 comprises the actual updating of the policy to indicate that pushing of content 90-n to device 54-n is to occur no longer.

Implementing block 415 on policy server 208-n results in policy server 208-n reverting to policy 98-n (as originally shown in FIG. 1) from policy 98-n' (as shown in FIG. 4). Likewise implementing block 415 on content server 82-n results in content server 82-n reverting to policy 94-n (as originally shown in FIG. 1) from policy 94-n' (as shown in FIG. 4). Upon completion of method 400 in both server 208-n and server 82-n using the second illustrative example, system 50 returns to the state shown in FIG. 1.

Figure 6:
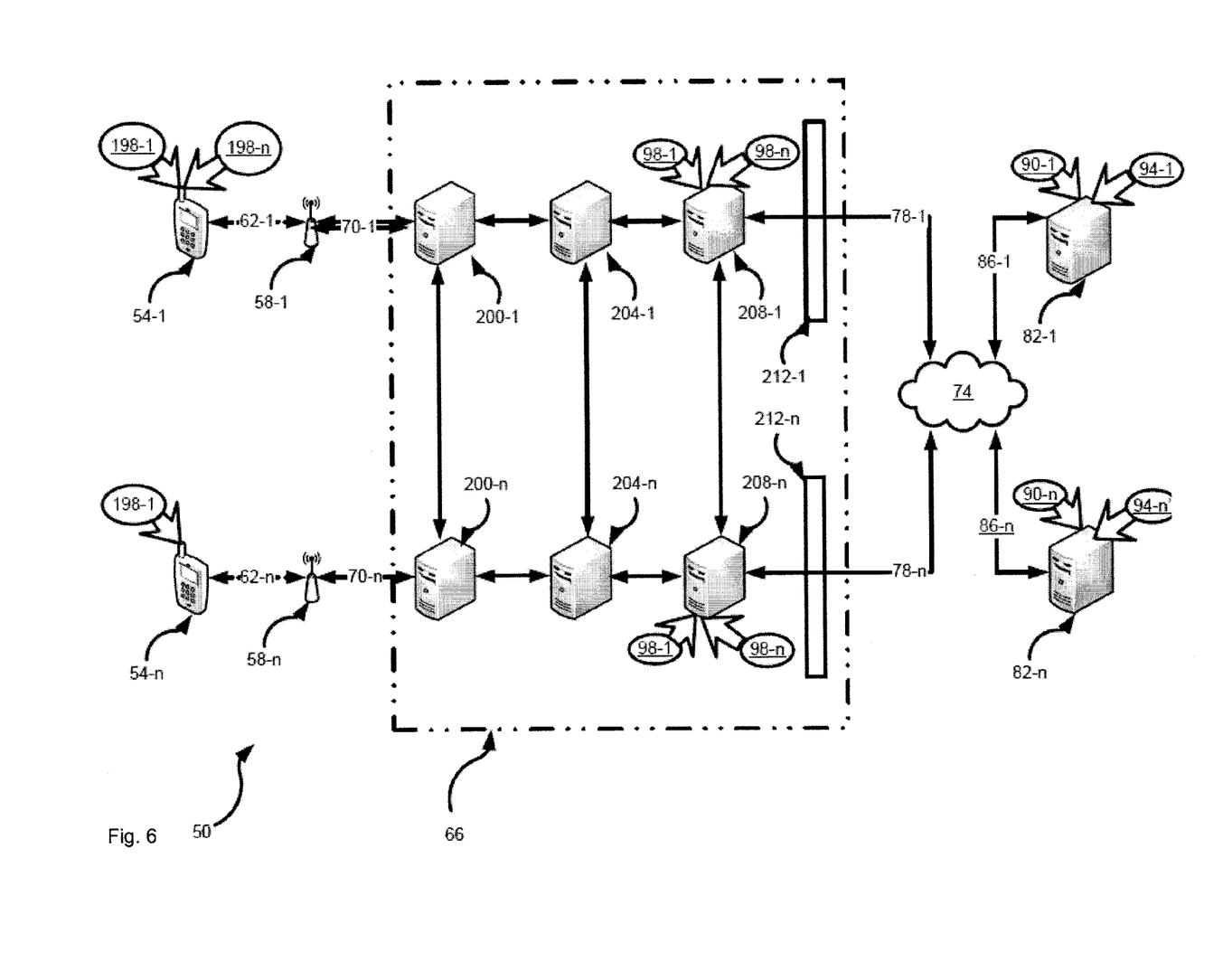
FIG. 6 shows the system of FIG. 1 according to an illustrative example whereby the push content policies are not synchronized.

It is contemplated that it can occur, however, that policies 98 can become unsynchronized with policies 94. For example, in the second illustrative example, if it were to occur that method 400 only occurred on server 208-n, but did not occur on server 82-n, then the situation could arise where server 82-n would attempt to continue to push content 90-n to device 54-n without authorization. FIG. 6 illustrates this scenario which will be referred to herein as the third illustrative example. In FIG. 6, policy 94-n' remains on server 82-n, thereby indicating that push content 90-*n* is to be forwarded to device 54-*n*. However, push application 198-*n* has been removed from device 54-*n*, and policy 98-*n* indicates that push content 90-*n* is not authorized for delivery to device 54-*n*.

Figure 7:
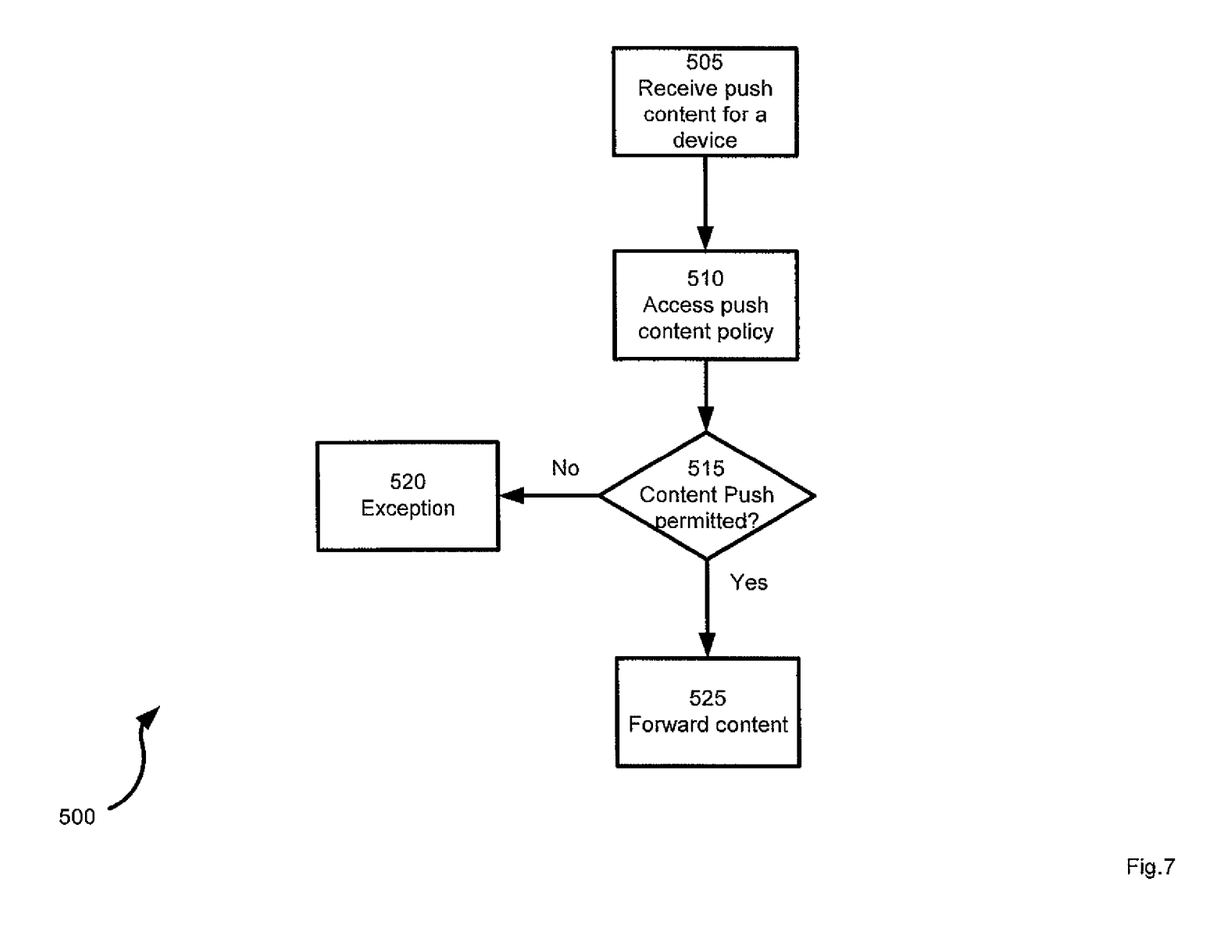
FIG. 7 shows a flowchart depicting a method for managing push content policy.

Referring now to FIG. 7, a method for managing push content is represented in the form of a flowchart and indicated generally at 500. Method 500 can be implemented using system 50 or variations thereof. For example, method 500 can also be implemented by policy server 208. Method 500 comprises policy server 208 receiving push content that is addressed to a particular device and determining whether delivery of that push content is authorized, and forwarding the push content or refusing to forward it, accordingly. According to the third illustrative example in FIG. 6, assume that content server 82-*n* attempts to send content 90-*n* to device 54-*n*. Thus, block 505 comprises receiving push content 90-*n* destined for device 54-*n*. Block 510 comprises accessing policy 98-*n*, and block 515 comprises determining if attempted push of content at block 505 is consistent with the policy accessed at block 510. According to the third illustrative example, a "no" determination will be reached at block 515 resulting in exception block 520. The exception block 520 includes dropping the push content received at block 505 so that it is never sent to device 54-*n*. Returning again to block 520, the exception generated at block 520 can also include a message to the content server 82 that attempted to send the unauthorized push content 90. The message can indicate that the content server 82 should update its policy 94 so that further attempts to push content 90 to the unauthorized device 54 do not occur. The exception generated at block 520 can also include a penalty whereby a daily allotment (e.g. as expressed in bytes) of content 90 that is permitted to be pushed to devices 54 is decremented, even though the content 90 itself was never actually forwarded to the device 54. The exception generated at block 520 can further include maintaining a record of the number of times a particular content server 82 attempts to send unauthorized push content 90, and upon exceeding a predefined number of times, instructing firewall 212 to temporarily, or even permanently, block that content server 82 from being able to send traffic to intermediation infrastructure 66.

Conversely, it will now be understood that a "yes" determination will be reached at block 515 any time that the policy 98 accessed by the policy server 208 confirms that delivery of push content 90 to a particular device 54 is permitted, which thereby leads to block 525 and causing that content 90 to be forwarded. Subsequent to block 525, method 500 can be enhanced such that when policy server 208 receives confirmation of delivery of push content 90 to the destination device 54, then policy server 208 will in turn send a confirmation of delivery back to the originating push content server 82.

Having read the foregoing, it should now be understood that variations, subsets or combinations or all of them are contemplated. For example, it is contemplated that policy 98 and policy servers 208 can be configured to include more than simple "yes" or "no" determinations as to whether or not to send content 90 to a particular device 54. For example, each application 198 can be configured to allow specification of conditions for delivery of content 90. Such conditions can include, by way of non-limiting examples: a) "Suspend delivery of content while device is roaming"; or b) "If roaming, only send text content and strip all other content"; or c) "Only send content during these specified times of day". As another example, intermediation infrastructure 66 can be configured to maintain data regarding the hardware and software capabilities of a particular device 54, and automatically transcode pushed content 90 from a format that originates from the content server 82 into another format that is particularly suitable for the capability of that particular device 54.

As another example, it is to be understood that while the foregoing contemplate push applications 198 that uniquely correspond to a particular push content 90, in other embodiments it is contemplated that one push application 198 can be configured to accept push content 90 from a plurality of different content servers 82 that host different push content 90.

It is to be understood that each server 82, 200, 204, 208, can be implemented using an appropriately configured hardware computing environment, comprising at least one processor, volatile storage (e.g. random access memory), non-volatile storage (e.g. hard disk drive), and at least one network interface all interconnected by a bus. Other components can also be connected to the processor via the bus, such as input devices and output devices. Likewise it is to be understood that the hardware computing environment of any particular server is configured to execute an operating system and other software such that the servers are ultimately configured to perform according to the teachings herein. Furthermore, it will be understood that each server can itself be implemented as several different servers, or alternatively one or more servers in FIG. 1 can be consolidated into a single server.

The invention claimed is:

1. A server comprising:
 a network interface for connecting, via a network, to a computing device and a content server; the content server configured to maintain push content; the computing device configured to selectively install or uninstall a push content application uniquely corresponding to the push content;
 a processor connected to the network interface, and configured to receive the push content addressed to the computing device;
 a storage device connected to the processor, and configured to maintain a policy indicating whether the push content application is installed on the computing device; the policy including an additional condition for controlling delivery of the push content to the computing device;
 the processor further configured to access the policy from the storage device when the push content is received;
 the processor further configured, based on the policy, to forward the push content to the computing device if the push content application is installed on the computing device and if the additional condition is satisfied, and to drop the content if the push content application is not installed on the computing device; and
 the processor further configured to decrement an allotment of the push content permitted to be delivered to the computing device by the content server.

2. The server of claim 1, the processor further configured to send an exception message to the content server if the push content application is not installed on the computing device.

3. The server of claim 2, the exception message including an instruction to the content server to update a policy maintained at the content server to cease sending further push content to the computing device.

4. The server of claim 2 wherein the network interface is connected to a firewall; the processor further configured to instruct the firewall to block further reception of any push content from the content server.

5. The server of claim 1, the processor further configured to block the forwarding of the push content when the allotment has reached zero.

6. The server of claim 1, the processor further configured to decrement the allotment regardless of whether or not the push content application is installed on the computing device.

7. The server of claim 1 wherein the additional condition permits the push content to be forwarded to the computing device only when the computing device is not roaming; the processor configured to forward the push content when the push content application is installed on the computing device and when the computing device is not roaming.

8. The server of claim 1 wherein the additional condition includes a time period when forwarding of the push content is permitted; the processor configured to forward the push content when the push content application is installed on the computing device and when the current time matches the time period.

9. A method of managing push content from a content server and addressed to a computing device; the content uniquely corresponding to a push content application; the method comprising:
   receiving at a processor, via a network interface, the push content addressed to the computing device from the content server;
   receiving at the processor, from a storage device, a policy indicating whether the push content application is installed on the computing device; the policy including an additional condition for controlling delivery of the push content to the computing device;
   forwarding from the processor, via the network interface, the push content to the computing device if the policy indicates the push content application is installed on the computing device and if the additional condition is satisfied;
   dropping the content if the policy indicates that the push content application is not installed on the computing device; and
   decrementing an allotment of the push content permitted to be delivered to the computing device by the content server.

10. The method of claim 9, further comprising sending an exception message to the content server if the push content application is not installed on the computing device.

11. The method of claim 10, the exception message including an instruction to the content server to update a policy maintained at the content server to cease sending further push content to the computing device.

12. The method of claim 10 wherein the network interface is further connected to a firewall; the method further comprising instructing the firewall to block further reception of any push content from the content server.

13. The method of claim 9, further comprising blocking forwarding of the push content to the computing device when the allotment has reached zero.

14. The method of claim 9 further comprising decrementing the allotment regardless of whether or not the push content application is installed on the computing device.

15. The method of claim 9 wherein the additional condition permits the push content to be forwarded to the computing device only when the computing device is not roaming; the method comprising forwarding the push content when the push content application is installed on the computing device and when the computing device is not roaming.

16. The method of claim 9 wherein the additional condition includes a time period when forwarding of the push content is permitted; the method further comprising forwarding the push content when the push content application is installed on the computing device and when the current time matches the time period.

17. A non-transitory computer readable medium storing a plurality of computer-readable instructions, the computer readable instructions executable by a processor of a server for implementing a method of managing push content from a content server and addressed to a computing device; the content uniquely corresponding to a push content application; the method comprising:
   receiving, via a network interface, the push content addressed to the computing device from the content server;
   receiving, from a storage device, a policy indicating whether the push content application is installed on the computing device; the policy including an additional condition for controlling delivery of the push content to the computing device;
   forwarding, via the network interface, the push content to the computing device if the policy indicates the push content application is installed on the computing device and if the additional condition is satisfied;
   dropping the content if the policy indicates that the push content application is not installed on the computing device; and
   decrementinq an allotment of the push content permitted to be delivered to the computing device by the content server.

* * * * *

UNITED STATES PATENT AND TRADEMARK OFFICE
CERTIFICATE OF CORRECTION

| | |
|---|---|
| PATENT NO. | : 9,021,463 B2 |
| APPLICATION NO. | : 14/028582 |
| DATED | : April 28, 2015 |
| INVENTOR(S) | : Yang et al. |

Page 1 of 1

It is certified that error appears in the above-identified patent and that said Letters Patent is hereby corrected as shown below:

In the claims:

Column 12, line 45, claim 17: Delete "decrementinq" and insert --decrementing--

Signed and Sealed this
Twentieth Day of October, 2015

Michelle K. Lee
*Director of the United States Patent and Trademark Office*